United States Patent [19]

Keens et al.

[11] Patent Number: 4,927,269
[45] Date of Patent: May 22, 1990

[54] CORRECTION OF NON-LINEARITIES IN DETECTORS IN FOURIER TRANSFORM SPECTROSCOPY

[75] Inventors: Axel Keens; Arno Simon, both of Karlsruhe, Fed. Rep. of Germany

[73] Assignee: Bruke Analytische Messtechnik GmbH, Rheinstetten, Fed. Rep. of Germany

[21] Appl. No.: 304,697

[22] Filed: Jan. 31, 1989

[51] Int. Cl.$^5$ .......................... G01B 9/02; G01J 3/45
[52] U.S. Cl. .................................................. 356/346
[58] Field of Search .......................................... 356/346

[56] References Cited

U.S. PATENT DOCUMENTS 4,682,022 7/1987 Hoult et al.

OTHER PUBLICATIONS

Grant R. Fowles, Introduction to Modern Optics, §3.9, (1968), pp. 84–86.
Mattson Instruments, Inc. Brochure entitled: Polaris/Icon FT/IR System.
Perkin–Elmer Brochure entitled: MCT Detectors for the Model 1800 FTIR Spectrophotometer; Jun., 1986.
Bruker Brochure entitled: IFS 66; 3/11/87.
Article on the J15 Series Mercury Cadmium Pelluride Detectors.
Willis, "Design and Performance of a New Double Beam Fast Fourier Transform Interferometer", *Infrared Physics*, vol. 16, No. 1–2, pp. 299–300, Mar. 1976.
Ng et al., "A Real-Time Correlation-Based Data Processing System for Interferometric Signals", *Applied Spectroscopy*, vol. 39, No. 5, pp. 841–847, 5/85.

*Primary Examiner*—Davis L. Willis
*Assistant Examiner*—Matthew W. Koren
*Attorney, Agent, or Firm*—Pennie & Edmonds

[57] ABSTRACT

An interferogram is formed as in the prior art by dividing a beam of radiation from the source into two beams and interfering these beams so as to form an interferogram on the detector. A Fourier transform is then made of this interferogram. This transform has a signal spectrum above the cutoff frequency of the detector; and because of non-linearities in the detector and in the electronic signal processing circuitry, this transform also has a spectrum below the cutoff frequency of the detector. In accordance with the invention, two correction factors are calculated from this Fourier transform and these correction factors are then used to calculate a corrected interferogram. The first correction factor is evaluated by determining from the portion of the spectrum below the cutoff frequency a valve for the spectral signal at zero frequency. In addition, the integral of the square of the spectrum signal above the cutoff frequency is determined and the correction factor is found by dividing the signal at zero frequency by the integral of the square of the spectrum above the cutoff. The second correction factor is a function of the first correction factor and the integral of the spectrum signal above cutoff. These two corrections factors are then used in calculating a second order approximation to a corrected interferogram. Finally to produce the corrected Fourier transform, a Fourier transformation is made.

11 Claims, 4 Drawing Sheets

CORRECTION OF NON-LINEARITIES IN DETECTORS IN FOURIER TRANSFORM SPECTROSCOPY

BACKGROUND OF THE INVENTION

This relates to Fourier transform spectroscopy and in particular, to a method and apparatus for correcting non-linearities in a detector and associated electronics of a Fourier transform spectrometer.

The general principles of Fourier transform spectroscopy are well known. In the typical spectrometer, two coherent beams of electromagnetic radiation are combined after traversing different optical paths so as to produce an interference pattern. The intensity in the interfering pattern varies in a manner that depends on the spectrum of the interfering beams. By recording the intensity as a function of the path difference between the two interfering beams, the power spectrum can be deduced. See for example, G. R. Fowles, *Introduction to Modern Optics* (Holt, Rhinehart & Winston, 1968).

Fourier transform infrared spectrometers are commercially available. Typically, they include a source of radiation, an interferometer, a sample compartment, a detector on which an interferogram is formed and signal processing electronics for processing an electronic signal representative of the interferogram and for Fourier transforming said signal. In present day systems typical detectors are a high sensitivity thermal DTGS detector or a liquid nitrogen cooled mercury-cadmium-telluride (MCT) detector.

The resulting Fourier transform is known to be inaccurate because of non-linearities in the detector and in the signal processing circuitry associated therewith. While compensation techniques exist for reducing these inaccuracies (see, for example, U.S. Pat. No. 4,682,022), these techniques are not altogether satisfactory. They are not as accurate as might be desired and they tend to be demanding of the available signal processing resources. In particular, if the detector is ac-coupled, non-linearities may not easily be eliminated by a simple correction circuitry or algorithm since the light intensity on the detector is not known. Moreover, this correction has to be adapted to the individual detector, in general requiring an individual calibration process.

SUMMARY OF THE INVENTION

We have derived a method and apparatus for compensating for such non-linearities in a spectrometer that offer significant improvement in the accuracy of the correction and are also implemented at reasonable cost in resources and time.

As in the prior art the spectrometer comprises a source of electromagnetic radiation, an interferometer, a detector such as a DTGS or MCT detector and an electronic signal processor. As is known, these detectors have a cutoff frequency such that they do not respond to incident radiation having a frequency less than the cutoff frequency.

An interferogram is formed as in the prior art by dividing a beam of radiation from the source into two beams and interfering these beams on the detector. The interferogram produced by the electronic signal processor contains spectral components above the cutoff frequency of the detector; and because of non-linearities in the detector and in the electronic signal processing circuitry, it also has spectral components below the cutoff frequency. When a Fourier transform is made of this interferogram, it has a signal spectrum above the cutoff frequency of the detector and also a spectrum below the cutoff frequency of the detector.

In accordance with the invention, two correction factors are calculated from the interferogram or from the Fourier transform and these correction factors are then used to calculate a corrected interferogram. The correction factors may be determined directly from the interferogram by digitally filtering the interferogram data to obtain a set of low frequency data points (with respect to the cutoff frequency) and a set of high frequency data points (with respect to the cutoff frequency). The correction factors are functions of a value (derived from the low frequency set of data points) that is representative of the spectral signal at zero frequency and numerical integrals of the high frequency data set or powers thereof.

Preferably, the two correction factors are determined from the Fourier transform of the interferogram. The first correction factor is evaluated by determining from the portion of the spectrum below the cutoff frequency a value for the spectral signal at zero frequency. Illustratively, this is done by making a linear fit to a portion of the spectrum below cutoff frequency and extrapolating this linear fit to zero frequency. In addition, the integral of the square of the spectrum signal above the cutoff frequency is determined and the correction factor is found by dividing the signal at zero frequency by the integral of the square of the spectrum above the cutoff. The second correction factor is a function of the first correction factor and the integral of the spectrum signal above cutoff.

These two corrections factors are then used in calculating a second order approximation to a corrected interferogram. Finally to produce the corrected Fourier transform, a Fourier transformation is made.

BRIEF DESCRIPTION OF THE DRAWINGS

These and other objects, features and advantages of the invention will become more readily apparent from the following detailed description of a preferred embodiment of the invention in which.

DETAILED DESCRIPTION OF A PREFERRED EMBODIMENT

Figure 1:
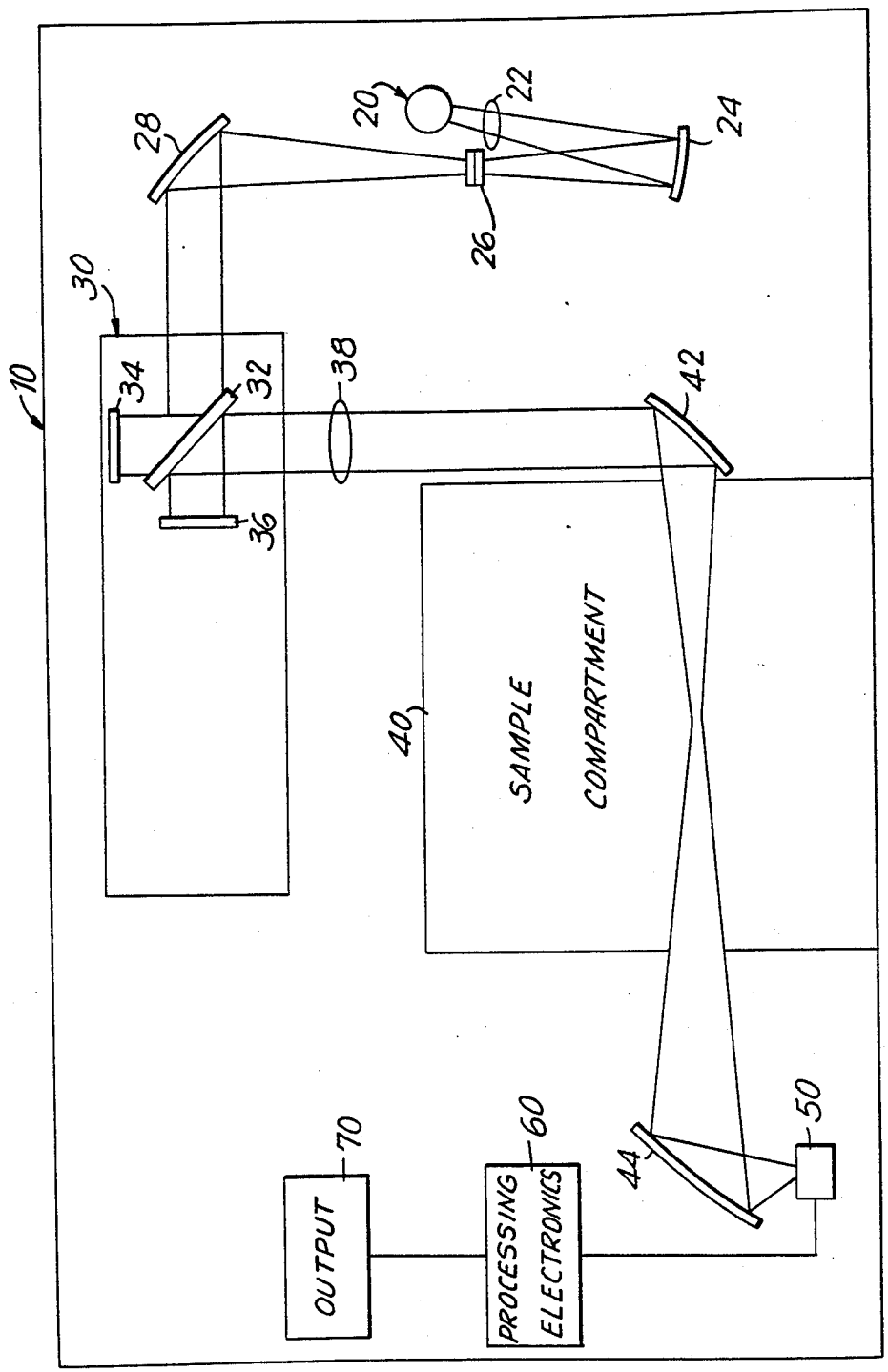
FIG. 1 is a schematic diagram depicting an illustrative embodiment of a Fourier Transform infrared spectrometer with which the invention may be practiced.

As shown in FIG. 1, a Fourier transform infrared spectrometer 10 illustratively comprises a source 20 of infrared radiation, an interferometer 30, a sample compartment 40, an infrared detector 50, processing electronics 60 and an output 70. A beam 22 of infrared radiation from source 20 is directed by a mirror 24 through one of a plurality of apertures 26 and is reflected by a second mirror 28 into interferometer 30. Interferometer 30 comprises a beam splitter 32, a first fixed mirror 34, and a second movable mirror 36 which is scanned by a suitable transport mechanism (not shown). Interferometer 30 is a conventional interferometer which splits incident beam 22 of infrared radiation into two beams which are reflected back along their incident paths by mirrors 34 and 36, respectively, and are recombined by beam splitter 32 into an exit beam 38 which is incident on mirror 42. Mirror 42 directs the beam through sampling compartment 40 onto mirror 44 which reflects the beam onto detector 50 where an infrared interferogram is formed.

Detector 50 and electronics 60 convert the infrared interferogram into an electrical signal which is then processed, for example, by a Fast Fourier transform computer to generate an appropriate signal output such as a plot of the spectrum of the sample. Detector 50 illustratively is a high sensitivity thermal DTGS detector or a liquid nitrogen cooled mercury-cadmium-telluride (MCT) detector. The detector has a cutoff frequency below which it has no response to incident radiation. Electronics 60 amplify an analog signal from detector 50, convert it to a digital signal and Fourier transform the digital signal to produce the sample spectrum. Output 70 may be any one or more appropriate devices for displaying and/or recording the output signal from the spectrometer. For example, the spectrum may be displayed on a chart recorder or on a cathode ray tube (CRT) and may also be recorded electronically, for example, on a magnetic tape or disk.

As is well known (see, for example U.S. Pat. No. 4,682,022), there are non-linearities in available infrared detectors and the signal processing circuitry associated therewith; and as a result, the spectrum generated by infrared spectrometers is inaccurate. While efforts have been made to reduce these inaccuracies, residual errors still remain and present compensation techniques tend to be extremely demanding of available signal processing resources.

We have developed a method of processing the interferogram which provides for compensation for such non-linearities. Advantageously, the method is independent of the type of detector, it is suitable for ac-coupled detectors, and does not require a different calibration procedure for each individual detector.

Figure 2:
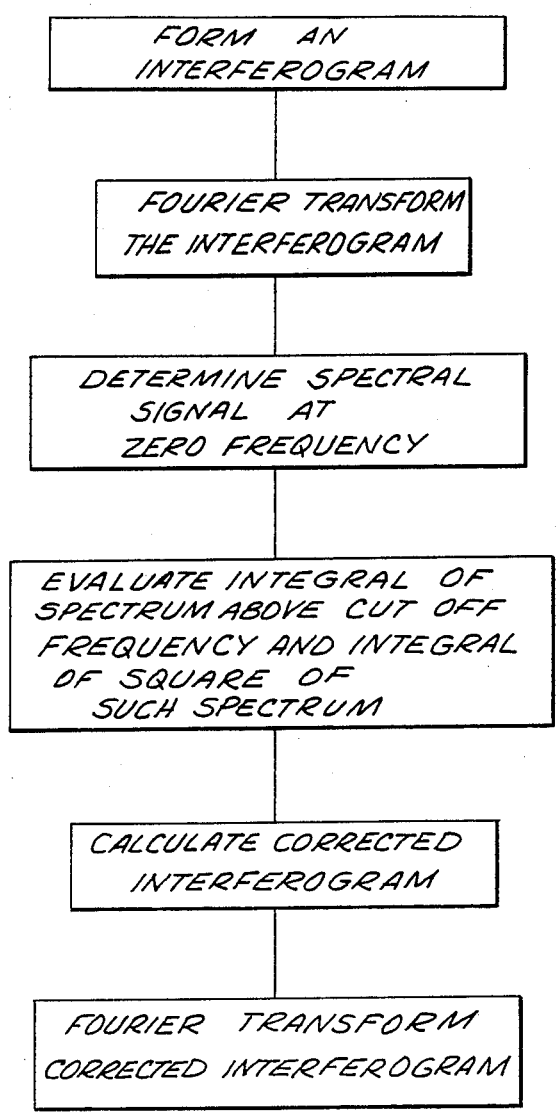
FIG. 2 is a flowchart depicting the operation of the invention.

As shown in FIG. 2, in the preferred embodiment of the invention, an interferogram is first formed on the detector and recorded electronically as in the prior art. A Fourier transform is then made of at least a portion of this interferogram. Advantageously, we have found that only a relatively small portion of the data in the central range of the interferogram need be used to make this Fourier transform, thereby substantially reducing processing time.

Figure 3:
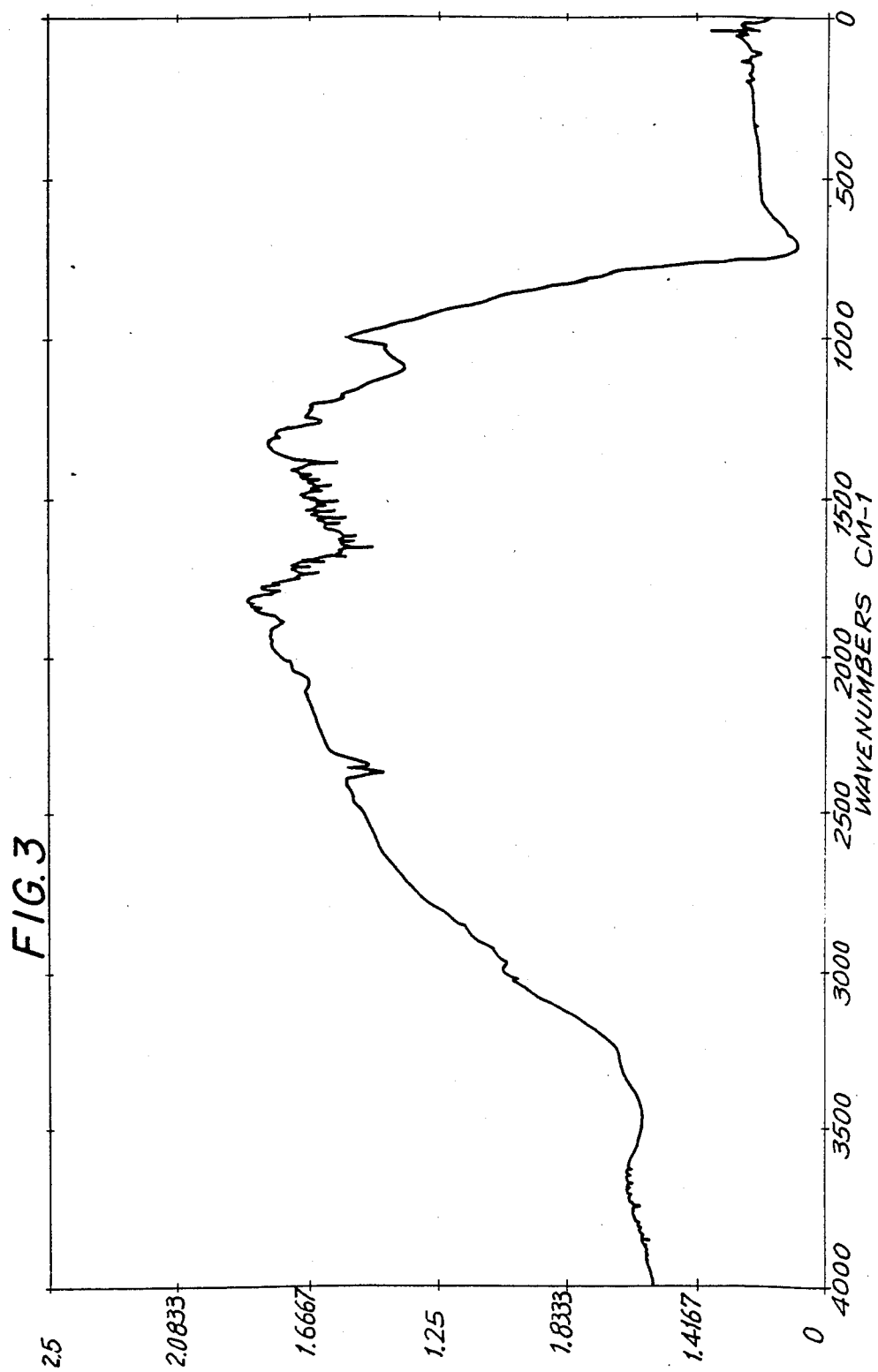
FIGS. 3 and 4 are illustrative spectra useful in understanding the invention.

The transform has a signal spectrum above the cutoff frequency of the detector; and because of non-linearities in the detector and in the electronic signal processing circuitry, the transform also has a spectrum below the cutoff frequency of the detector. Such a transform is illustrated in FIG. 3 where the portion of the spectrum to the right of about 700 cm$^{-1}$ is below the cutoff frequency.

In accordance with the invention, two correction factors are calculated from this Fourier transform and these correction factors are then used to calculate a corrected interferogram. The first correction factor is evaluated by determining from the portion of the spectrum below the cutoff frequency a value for the spectral signal at zero frequency. Illustratively, this is done by making a linear fit at a portion of the spectrum below cutoff frequency and extrapolating this linear fit to zero frequency. In the spectrum of FIG. 3, the value of the spectral signal at zero frequency is approximately 0.25. In addition, the integral of the square of the spectrum signal above the cutoff frequency is determined and the correction factor is found by dividing the signal at zero frequency by the integral of the square of the spectrum above the cutoff. The second correction factor is a function of the first correction factor and the integral of the spectrum signal above cutoff.

Figure 4:
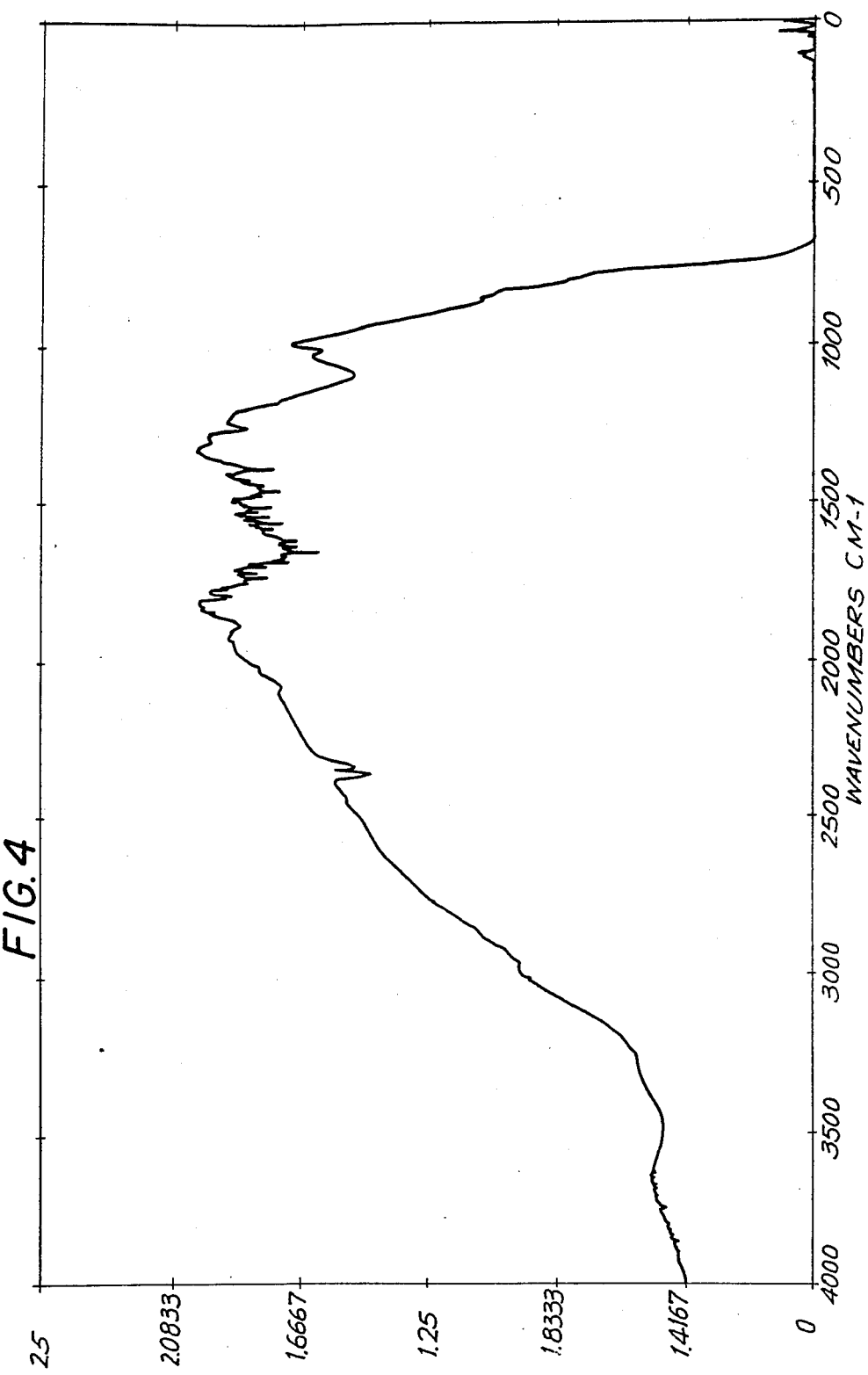

These two correction factors are then used in calculating a second order approximation to a corrected interferogram. Finally to produce the corrected Fourier transform, a Fourier transformation of the complete interferogram is made. Such a corrected transform is shown in FIG. 4. As is apparent, substantially all the spectrum below the cutoff frequency has been eliminated.

In particular, in a preferred embodiment of the invention the correction factors are determined and used as follows in correcting an interferogram.

The measured interferogram, $I_M$, can be described in terms of the true interferogram, I, as follows $$I_M(s) = I(s) - aI^2(s) + \text{higher order terms} \quad (1)$$

where $I_M$ and I are functions of s which is the position of the movable mirror 36.

I(s) has a d.c. component and a modulated or a.c. component. Hence I(s) can be written $$I(s) = I_D(s) + \tilde{I}(s) \quad (2)$$

where $I_D(s)$ is the d.c. component and $\tilde{I}(s)$ is the a.c. component.

Substituting (2) into (1) and ignoring the higher order terms:

$$\begin{aligned} I_M(s) &= I_D(s) + \tilde{I}(s) - a(I_D^2(s) + 2I_D(s)\tilde{I}(s) + \tilde{I}(s)^2) \\ &= I_D(s) - aI_D(s)^2 + (1 - 2aI_D(s))\tilde{I}(s) - a\tilde{I}^2(s) \end{aligned} \quad (3)$$

The modulated part of the measured interferogram, $\tilde{I}_M(s)$, is given by:

$$\tilde{I}_M(s) = (1 - 2aI_D(s))\tilde{I}(s) - a\tilde{I}^2(s) \quad (4)$$

We assume that the corrected interferogram, $\tilde{I}_C(s)$, has the form $$\tilde{I}_C(s) = \alpha(\tilde{I}_M(s) + \beta \tilde{I}_M^2(s)) \quad (5)$$

where $\alpha$ and $\beta$ are coefficients to be determined.

Substituting (4) into (5):

$$\tilde{I}_C(s) = \quad (6)$$

$$\alpha[(1 - 2aI_D(s))\tilde{I}(s) - a\tilde{I}^2(s) + \beta[(1 - 2aI_D(s))^2\tilde{I}^2(s) -$$

$$a(1 - 2aI_D(s))\tilde{I}^3(s) + a^2\tilde{I}^4(s)]]$$

Ignoring the higher order terms, $\tilde{I}^3$ and $\tilde{I}^4$,:

$$\tilde{I}_C(s) = \alpha[(1 - 2aI_D(s))\tilde{I}(s) + (\beta(1 - 2aI_D(s))^2 - a)\tilde{I}^2(s)] \quad (7)$$

To make the corrected interferogram equal to the true interferogram, i.e., $\tilde{I}_C(s) = \tilde{I}(s)$, the coefficient of the first term in (7) must equal 1 and the coefficient of the second term must equal 0. Hence $$\alpha(1 - 2a\, I_D(s)) = 1 \quad (8)$$

and $$\beta(1-2a\,I_D(s))^2 - a = 0 \quad (9)$$

Rearranging terms:

$$\alpha = 1/1 - 2aI_D(s) \quad (10)$$

and $$\beta = a/(1 - 2aI_D(s))^2 \quad (11)$$

In accordance with the invention, we have discovered the $\alpha$ and $\beta$ can be derived from the Fourier transformation of a portion of the measured interferogram. In particular, the Fourier transform, $S_M(\bar{v})$, of the measured interferogram can be written as follows:

$$S_M(v) = \int_{-\infty}^{\infty} \tilde{I}_M(s)\cos(2\pi\bar{v}s)d\bar{v} \quad (12)$$

Substituting (4) into (12):

$$S_M(\bar{v}) = (1 - 2aI_D(s)) \int_{-\infty}^{\infty} \tilde{I}(s)\cos(2\pi\bar{v}s)d\bar{v} -$$

$$a \int_{-\infty}^{\infty} \tilde{I}^2(s)\cos(2\pi\bar{v}s)d\bar{v}$$

$$= (1 - 2aI_D(s))S(\bar{v}) - a \int_{-\infty}^{\infty} \tilde{I}^2(s)\cos(2\pi\bar{v}s)d\bar{v}$$

The integral term in (13) can be shown to be equal $$-\frac{a}{2} \int_{-\infty}^{\infty} (S(\bar{v} - \bar{v}') + S(\bar{v} + v'))S(\bar{v}')d\bar{v}' \quad (14)$$

Detector 50 has a cutoff frequency or wave number, $v$=cutoff, below which the true signal spectrum is zero (i.e., $S(v<\text{cutoff})=0$. Hence, $$S_M(0) = 0 - \frac{a}{2} \int_{\text{cutoff}}^{\infty} (S(-\bar{v}) + S(\bar{v}'))S(\bar{v}')d\bar{v}' \quad (15)$$

$$= -a \int_{\text{cutoff}}^{\infty} S^2(\bar{v}')d\bar{v}'$$

Moreover, if we ignore the integral term in (13) because it is small and rewrite the equation:

$$S(v) = \frac{S_M(\bar{v})}{1 - 2aI_D(s)} \quad (16)$$

Substituting (16) into (15):

$$S_M(0) = \frac{-a}{(1 - 2aI_D(s))^2} \int_{\text{cutoff}}^{\infty} S_M^2(v)d(\bar{v}) \quad (17)$$

The coefficient of the integral is the term $\beta$ defined in (11). Hence $$\beta = \frac{S_M(0)}{\int_{\text{cutoff}}^{\infty} S_M^2(\bar{v})d\bar{v}} \quad (18)$$

Thus $\beta$ is a function of the measured signal at zero frequency divided by the integral of the square of the measured spectrum signal over the interval from the cutoff frequency to infinity. Illustratively, the measured signal at zero frequency can be determined by a linear extrapolation to zero frequency of the portion of the measured spectrum below the cutoff frequency. The integral is determined by conventional methods.

To calculate $\alpha$, it is known that the integral of the spectrum signal can be expressed in terms of a product of the d.c. interferogram and a modulation coefficient, $\eta$, of the spectrometer as follows $$\int_{\text{cutoff}}^{\infty} S(\bar{v})d\bar{v} = \eta\, I_D(s) \quad (19)$$

The determination of the modulation coefficient, $\eta$, is well known in the art. A typical value is $\eta=0.8$.
Substituting (16) into (19):

$$\int_{\text{cutoff}}^{\infty} \frac{S_M(\bar{v})d\bar{v}}{1 - 2aI_D(s)} = \eta\, I_D(s) \quad (20)$$

and rearranging terms:

$$I_D(s)(1 - 2aI_D(s)) = \frac{1}{\eta} \int_{\text{cutoff}}^{\infty} S_M(\bar{v})d\bar{v} \quad (21)$$

Multiplying (21) by $\beta = a/(1 - 2aI_D(S))^2$:

$$\frac{aI_D(s)}{1 - 2aI_D(s)} = \frac{\beta}{\eta} \int_{\text{cutoff}}^{\infty} S_M(\bar{v})d\bar{v} \quad (22)$$

Further, multiplying (22) by 2 and adding 1 yields $$\frac{2aI_D(s)}{1 - 2aI_D(s)} + 1 = 1 + \frac{2\beta}{\eta} \int_{\text{cutoff}}^{\infty} S_M(\bar{v})d\bar{v}$$

$$\frac{2aI_D(s) + 1 - 2aI_D(s)}{1 - 2aI_D(s)} = 1 + \frac{2\beta}{\eta} \int_{\text{cutoff}}^{\infty} S_M(\bar{v})d\bar{v}$$

$$\frac{1}{1 - 2aI_D(s)} = 1 + \frac{2\beta}{\eta} \int_{\text{cutoff}}^{\infty} S_M(\bar{v})d\bar{v} \quad (23)$$

But from (10) $\alpha = 1/(1 - 2aI_D(s))$. Hence, $$\alpha = 1 + \frac{2\beta}{\eta} \int_{\text{cutoff}}^{\infty} S_M(\bar{v})d\bar{v} \quad (24)$$

Thus $\alpha$ is a function of $\beta$ which is determined from (18), the modulation efficiency and the integral of the measured spectrum signal over the interval from cutoff to infinity.

As indicated above, FIGS. 3 and 4 illustrate two spectra, the first of which was obtained without correction for non-linearities and the second of which was obtained with correction. The detector used was a MCT detector having a cutoff frequency corresponding to a wave number of approximately 700 cm$^{-1}$. As will be apparent in FIG. 3, there is a substantial spectral component below the cut off frequency. In accordance with the invention, a fit is made to the spectrum of this component to obtain the spectral signal at zero frequency. The integral over the remaining portion of the spectrum and the integral of the square of the remaining portion of the spectrum are also calculated. From these values correction coefficients are obtained which are used to correct the interferogram and to produce the corrected spectrum as shown in FIG. 4.

As will be apparent to those skilled in the art, numerous variations may be made in the practice of the invention. While the invention has been described in terms of the correction of second order (or quadratic deviations) the principle of the invention could be extended to higher order terms as well. In addition, while the preferred embodiment of the invention determines the correction coefficients from a Fourier transform of the uncorrected interferogram, the correction coefficients could also be calculated directly from the interferogram by digitally filtering the interferogram data so as to obtain a set of low frequency data points below the cutoff frequency, a set of high frequency data points above the cutoff frequency. The spectral signal at zero frequency can be derived from the low frequency set of data points and numerical integrals can be calculated of the high frequency data set or powers thereof. Correction factors can then be calculated in a manner analogous to that set forth above.

What is claimed is:

1. In a Fourier transform spectrometer comprising means for forming an interferogram, a detector for detecting the interferogram and signal processing means connected to said detector for Fourier transforming a signal representative of the interferogram detected by said detector, a method of compensating for non-linearities in said detector and/or said signal processing means comprising the steps of:
   forming an interferogram by interfering two beams of radiation,
   detecting said interferogram by producing a signal representative of said interferogram,
   said signal having first spectral components below a cutoff frequency of said detector and second spectral components above said cutoff frequency,
   determining from said first and second spectral components first and second correction factors of the interferogram,
   calculating a corrected interferogram using said first and second correction factors, and
   Fourier transforming said corrected interferogram to form a corrected Fourier transform.

2. The method of claim 1 wherein said first and second spectral components of said signal representative of the interferogram are obtained by digital filtering.

3. The method of claim 1 wherein the spectrometer is an infrared spectrometer.

4. The method of claim 1 wherein the step of calculating a corrected interferogram comprises the step of calculating a first correction factor which is a function of a spectral signal at zero frequency and a numerical integral of the square of the second spectral components and a second correction factor which is a function of the first correction factor, a modulation coefficient of the spectrometer and a numerical integral of the second spectral components and using said correction factors in making a second order correction of the interferogram.

5. The method of claim 4 wherein the first correction factor is equal to the spectral signal at zero frequency divided by the numerical integral of the square of the second spectral components and the second correction factor is equal to one plus twice the value of the first correction factor times the numerical integral of the second spectral components divided by the modulation coefficient of the spectrometer.

6. In a Fourier transform spectrometer comprising means for forming an interferogram, a detector for detecting the interferogram and signal processing means connected to said detector for Fourier transforming a signal representative of the interferogram detected by said detector, a method of compensating for non-linearities in said detector and/or said signal processing means comprising the steps of:
   forming an interferogram by interfering two beams of radiation,
   Fourier transforming said interferogram, said Fourier transform having a first spectrum below a cutoff frequency of said detector and a second spectrum above said cutoff frequency,
   determining from said first spectrum a spectral signal at zero frequency,
   evaluating an integral of the second spectrum and an integral of a square of the second spectrum,
   calculating a corrected interferogram using said interferogram, the spectral signal at zero frequency, the integral of the second spectrum and the integral of the square of the second spectrum, and
   Fourier transforming said corrected interferogram to form a corrected Fourier transform.

7. The method of claim 6 wherein the spectrometer is an infrared spectrometer.

8. The method of claim 6 wherein the step of calculating a corrected interferogram comprises the step of calculating a first correction factor which is a function of the spectral signal at zero frequency and the integral of the square of the second spectrum and a second correction factor which is a function of the first correction factor, a modulation coefficient and the integral of the second spectrum and using said correction factors in making a second order correction of the interferogram.

9. The method of claim 8 wherein the first correction factor is equal to the spectral signal at zero frequency divided by the integral of the square of the second spectrum and the second correction factor is equal to one plus twice the value of the first correction factor times the integral of the second spectrum divided by the modulation coefficient of the spectrometer.

10. In a Fourier transform spectrometer comprising means for forming an interferogram, a detector for detecting the interferogram and signal processing means connected to said detector for Fourier transforming a signal representative of the interferogram detected by said detector, a lower frequency limit of effective spectral response of the detector defining a cutoff frequency of the detector, a method of compensating for non-linearities in said detector and/or said signal processing means comprising the steps of:
   forming an interferogram by interfering two beams of coherent radiation on said detector,
   Fourier transforming a signal from the detector representative of the interferogram to define an uncompensated Fourier transform spectrum of said interferogram, said Fourier transform having a first frequency spectrum below said cutoff frequency of said detector and a second frequency spectrum above said cutoff frequency,
   determining from said first frequency spectrum a spectral signal at zero frequency,
   evaluating an integral of the second frequency spectrum and an integral of a square of the second frequency spectrum, calculating a corrected interferogram using said interferogram, the spectral signal at zero frequency, the integral of the second frequency spectrum and the integral of the square of the second frequency spectrum, and Fourier transforming said corrected interferogram.

11. The method of claim 10 wherein the spectrometer is an infrared spectrometer.

* * * * *